United States Patent [19]

Jordan

[11] Patent Number: 4,662,499

[45] Date of Patent: May 5, 1987

[54] CONTROL CLUTCH WITH INTERACTING VISCOUS CONTROL UNIT AND FRICTIONAL CLUTCH UNIT

[75] Inventor: Alfons Jordan, Hennef, Fed. Rep. of Germany

[73] Assignee: Uni-Cardan Aktiengesellschaft, Siegburg, Fed. Rep. of Germany

[21] Appl. No.: 753,407

[22] Filed: Sep. 16, 1985

[51] Int. Cl.⁴ .................... F16D 29/00; F16D 43/25; F16H 1/455

[52] U.S. Cl. .................... 192/82 T; 192/90; 74/711

[58] Field of Search ............ 192/82 T, 84 Cl85 AA, 192/90; 74/711

[56] References Cited

U.S. PATENT DOCUMENTS

| | | | |
|---|---|---|---|
| 2,965,207 | 12/1960 | Snyder | 192/85 AA |
| 3,224,540 | 12/1965 | Straub | 192/90 |
| 3,285,379 | 11/1966 | Helquist | 192/85 AA |
| 3,923,113 | 12/1975 | Pagdin | 192/82 T X |
| 4,022,084 | 5/1977 | Pagdin et al. | 74/711 |
| 4,031,780 | 6/1977 | Dolan et al. | 74/711 |
| 4,040,271 | 8/1977 | Rolt et al. | 192/82 T X |
| 4,048,872 | 9/1977 | Webb | 74/711 |
| 4,058,027 | 11/1977 | Webb | 74/711 |
| 4,090,597 | 5/1978 | Folomin et al. | 192/85 AA |
| 4,096,712 | 6/1978 | Webb | 192/82 T X |

FOREIGN PATENT DOCUMENTS

| | | |
|---|---|---|
| 2920107 | 11/1980 | Fed. Rep. of Germany . |
| 414662 | 8/1934 | United Kingdom . |
| 918125 | 4/1982 | U.S.S.R. .................... 74/711 |

Primary Examiner—Rodney H. Bonck
Assistant Examiner—Richard M. Lorence
Attorney, Agent, or Firm—Toren, McGeady and Goldberg

[57] ABSTRACT

A control clutch mechanism embodying a first aspect of the invention has an inner clutch part and an outer clutch part defining an annular space therebetween, with a viscous control unit and a frictional clutch unit being provided which consist of two sets of plates arranged in the annular space, each set of plates including plates alternately nonrotatively connected with one of the clutch parts, respectively. An axially movable annular piston is slidingly arranged in fluid-tight engagement between the viscous control unit and the frictional clutch unit and a pressure plate is located between the annular piston and the frictional clutch unit. A first stop is provided for the annular piston and a first spring acts between the piston and the pressure plate. The viscous control unit is structured to transmit a negligibly low nominal torque as compared with the frictional clutch unit and, in accordance with a second aspect of the invention, the frictional clutch unit is provided with an annular flange which is moved by operation of an electromagnet against a second spring and against a second stop so as to relieve the pressure on the first spring, thereby bringing the control clutch mechanism into a freewheeling state by energization of the electromagnet.

5 Claims, 4 Drawing Figures

CONTROL CLUTCH WITH INTERACTING VISCOUS CONTROL UNIT AND FRICTIONAL CLUTCH UNIT

The present invention relates generally to clutch assemblies and more particularly to a control clutch mechanism having a viscous control unit and a frictional clutch unit connected in series with each other.

Control clutches of the type to which the present invention relates may have a pair of multi-plate clutch units connected in series, one of the units being designed as a viscous control unit and the other being a friction clutch unit. The clutch assembly may consist of an inner and outer clutch part and two sets of plates which are arranged in an annular space formed between the two clutch parts operating to define the viscous control unit and the frictional clutch unit, respectively. The plate sets consist of plates alternately nonrotatively connected, respectively, with the inner and outer clutch parts with one set of plates forming the viscous control unit and the other set forming the frictional clutch unit. Each set of plates contains inner plates attached to the inner clutch unit and outer plates attached to the outer clutch unit, with the inner and outer plates of the viscous control unit being maintained spaced apart an axial distance from each other which is greater than the thickness of the plates.

In the prior art, there is disclosed in U.S. Pat. No. 4,058,027 a viscous control unit having a frictional clutch connected in parallel, the purpose of the frictional clutch being to compensate for the reduction in torque occurring when the viscous control unit becomes heated and to return the viscous control unit to a lower temperature range by partially undertaking the transmission of torque. Loading of the friction clutch is achieved by the effect of the increase of the temperature of the viscous control unit and the resulting increase in pressure on a differential piston.

The disadvantage of a control clutch such as that mentioned above is that the viscous control unit which participates to considerable extent in the transmission of torque will demonstrate highly temperature-dependent torque behavior. This will simultaneously affect the loading of the friction clutch so that uncontrollable transmission conditions will arise in the entire control clutch unit.

A further disadvantage is that the operating chambers of the viscous control unit and of the frictional clutch unit are not separated one from the other so that both units must be filled by the same fluid. This means that for the frictional clutch unit, in particular, it is not possible to achieve optimum frictional conditions.

Still another disadvantage is that the maximum torque cannot be clearly defined since it depends upon the existing temperature of the viscous control unit.

Accordingly, with regard to a first aspect thereof, the present invention is directed toward providing a control clutch mechanism which may be engaged automatically, which transmits a defined maximum torque and which is largely independent of the transmission behavior of the viscous control unit while, at the same time, making it possible to fill both the viscous control unit and the frictional clutch unit with a medium which creates optimum conditions for each.

In accordance with this first aspect of the invention, the viscous control unit and the frictional clutch unit are separated from one another so as to be leak-proof by an axially movable annular piston. The axial sliding path of the annular piston is limited by a stop arranged at its end facing the frictional clutch unit.

At least one pressure spring is provided between the annular piston and the pressure plate arranged in front of the frictional clutch unit at the annular piston end. The viscous control unit, as compared to the frictional clutch unit, has a negligibly low transferrable nominal torque.

Furthermore, in the prior art, British Patent No. 414,662 discloses a hydraulic clutch, in the case of which, the transferrable torque is controlled by changing the active amount of fluid. The active amount of fluid is transferred from one or several working chambers into storage chambers, as a result of which, the clutch can be controlled up to the point of complete freewheeling.

The disadvantage of this design described in the prior art is that the change in torque following movement of the fluid is very slow, and that, therefore, this type of clutch is not suitable for applications where, for reasons of safety, a rapid change into the freewheeling state is necessary.

Additionally, in the prior art, in DE-OS No. 29 20 107, there is disclosed a differential lock which is loaded in the direction of operation by an electrical magnet. The disadvantage of this type of design is that there must be a magnetic field during the entire period of operation. This leads to relatively high energy consumption. Furthermore, the frictional clutch having the locking effect cannot be used for automatically engaging the differential lock or an additional drive axle.

Therefore, in accordance with a second aspect thereof, the present invention is directed to an improvement for further developing an automatically engaging control clutch having a design of the type described, wherein immediate change to the freewheeling position may be achieved.

SUMMARY OF THE INVENTION

Briefly, in accordance with the first aspect thereof, the present invention may be defined as a control clutch mechanism comprising: an inner and an outer clutch part; a viscous control unit and a frictional clutch unit, each being formed to consist of a set of plates arranged in an annular space formed between the two clutch parts with each of the plate sets consisting of plates which are alternately arranged to be rotatively affixed, respectively, to the inner and outer clutch parts. The plates of the viscous control unit are held spaced at an axial distance from one another which is greater than the thickness of the plates and an axially movable annular piston slidingly arranged in fluid-tight engagement is provided between the viscous control unit and the frictional clutch unit. A pressure plate is located between the annular piston and the frictional clutch unit and at least one pressure spring is operatively interposed between the annular piston and the pressure plate. The viscous control unit is structured to transmit a negligibly low nominal torque, as compared with the frictional clutch unit.

Thus, in accordance with the features of this aspect of the invention, the objectives thereof are achieved in that: the viscous control unit and the frictional clutch unit are separated from one another by the axially movable annular piston in a leak-proof manner; the axial sliding path of the annular piston is limited by a stop arranged at its end facing the frictional clutch unit;

there is provided at least one pressure spring between the annular piston and the pressure plate which is arranged in front of the frictional clutch unit at the annular piston end, and the viscous control unit transfers a negligibly low nominal torque as compared with the frictional clutch unit.

The advantage of the control mechanism in accordance with the first aspect of the invention is that the uncontrollable temperature-dependent torque behavior of the viscous control unit will not cause uncontrollable transmission conditions and the maximum transferable torque of the control clutch mechanism is limited by the annular piston contacting the stop provided at the friction clutch end.

Any possible further increases in pressure in the viscous control unit would not lead to higher torques when the annular piston engages the stop.

In accordance with a further essential aspect of the present invention, the control clutch mechanism is arranged in a driveline connecting two axles with the torque capacity of the control clutch mechanism being slightly higher than the maximum torque introduced by the engine into the driveline.

In the case of this proposed application of the invention, the control clutch mechanism is capable of automatically engaging a second drive axle, when slippage occurs in the main drive axle, and simultaneously avoiding any torsion within the driveline which occurs when negotiating sharp bends and which is greater than existing driving torques. This embodiment of the control clutch mechanism in accordance with the invention permits utilization of an automatically engageable four-wheel drive with the additional advantage that there is no need for a longitudinal differential between the axles.

In an advantageous embodiment of this aspect of the invention, provision is made for the control clutch mechanism to be utilized as a differential brake. In this embodiment, the control clutch mechanism acts as a differential brake engaged when required, and, in this case, also, any torsion occurring between the drive axles and wheels when negotiating sharp bends may be avoided because of the design of the control clutch mechanism.

In accordance with the second aspect of the invention, there is provided a control clutch mechanism comprising an inner clutch part and an outer clutch part defining an annular space therebetween with two sets of plates arranged in said annular space, one set of said plates defining the viscous control unit and the other set of plates defining the frictional clutch unit. An axially movable annular piston is slidingly arranged in fluid-tight engagement between the viscous control unit and the frictional clutch unit, and a pressure plate is located between the annular piston and the frictional clutch unit for transmitting, in a fluid-tight manner, pressure from the viscous control unit to the frictional clutch unit. First spring means are provided operatively interposed between the annular piston and the pressure plate and the viscous control unit is structured to transmit a negligibly low nominal torque, as compared with the frictional clutch unit.

In accordance with the improvement of this second aspect of the present invention, at the end of the frictional clutch unit facing away from the annular piston, there is provided an annular flange which is supported against second spring means, whose spring force is greater than the force of the first spring means. Electromagnetic means are provided, whereby the annular flange may be moved against a stop by an electromagnetic force acting against the force of the second spring means in order to effect switching of the control clutch to the freewheeling position. Movement of the annular flange is effected by the force of a magnetic field developed by the electromagnetic means, such that, the load on the first spring means is completely relieved when the annular piston rests against a stop which limits the axial travel thereof.

A significant advantage of the control clutch mechanism designed in accordance with the present invention is that the friction clutch unit determining the output torque through actuating the electromagnet and the resulting movement of the annular flange forming the base plate of the friction clutch away from the friction clutch cause an immediate change of the clutch in the freewheeling position.

This control clutch arrangement is particularly advantageous when used for the purpose of automatically engaging a further drive axle of a vehicle drive. Engagement of the clutch by energizing the electromagnet may, in this case, be effected by operating a brake pedal. In such a case, if braking is necessary, it will be insured that the multi-axle drive is placed out of operation, which means that any difficulties that might arise, especially if the vehicle is equipped with an anti-lock system, can be avoided.

If an anti-lock system is provided, the driving wheels placed into the freewheeling position by the electromagnet act as undriven freewheeling wheels whenever a braking operation occurs.

The principle upon which the invention is based may of course also be applied to differential locks in the case of which the locking effect is eliminated by operating the brake pedal in order not to negatively influence any anti-locking system.

The various features of novelty which characterize the present invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
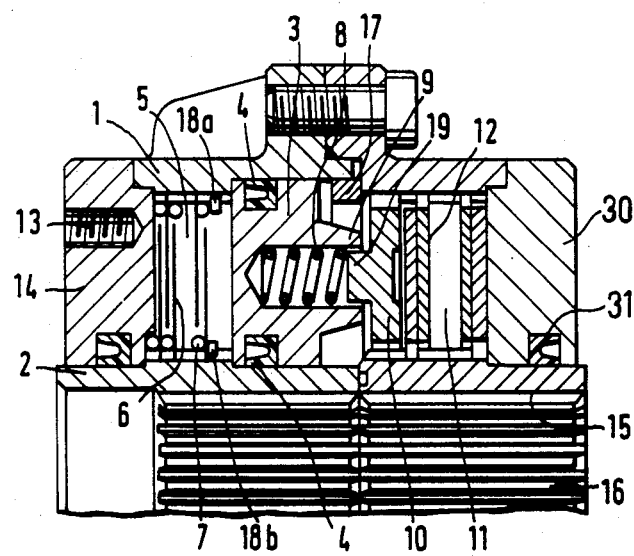
FIG. 1 is a sectional view showing a part of a control clutch mechanism in accordance with the first aspect of the invention.

Referring now to the drawings, and particularly to FIG. 1, there is illustrated a control clutch mechanism in accordance with the first aspect of the present invention, wherein there is provided a viscous control unit 5 and a frictional clutch unit 11.

The overall control clutch mechanism consists essentially of an outer clutch part 1 and an inner clutch part 2, with these two parts being supported against each other. The inner clutch part 2 is provided with a throughbore 16 having a multiple wedge profile or splined configuration 15. The clutch part 2 is axially fixed on a profiled shaft emerging from the transmission and the outer clutch part 1 has been provided with a flange connection 14 which may be attached to the drive shaft of the driveline (not shown) by means of threaded fixing bores 13.

The viscous control unit 5 is illustrated on the left-hand side of FIG. 1 and consists of a plurality of plates 6 alternately nonrotatively connected to the outer clutch part 1 and the inner clutch part 2, respectively. Between the plates 6, associated with each clutch part 1 and 2, provision is made for spacers 7 which consist of wire rings, for example.

The plates 6 are limited in their axial movement by inner and outer axial fixing means 18a and 18b.

The right-hand side of FIG. 1 depicts the frictional clutch unit 11 as consisting of plates 12 which are also alternately nonrotatively connected with the outer clutch part 1 and the inner clutch part 2, respectively. Opposite the pressure plate 10, the end 1 of the plates 12 abuts a reaction member 30 affixed to the outer coupling part 1 and being in sealing engagement with the inner coupling part 2 by means of a seal 31.

Both plates of the viscous control unit 5 and of the frictional clutch unit 11 are nonrotatively connected to the clutch parts 1, 2 preferably by means of multi-wedge proviles.

At the inside of the frictional clutch unit 11, provision is made for a pressure plate 10 which is also nonrotatively connected with the outer clutch part 1. Between the viscous control unit 5 and the frictional clutch unit 11, there is arranged an annular piston 3 which separates the two operating chambers of the viscous control unit 5 and the frictional clutch unit 11 by seals 4 so as to make them leak-proof. This makes it possible to fill the operating chambers of the viscous control unit 5 and of the frictional clutch unit 11 with different fluids and the frictional clutch unit could easily be a dry clutch.

Between the annular piston 3 and the pressure plate 10, there are provided pressure springs 8 arranged in bores distributed uniformly about the circumference of the annular piston 3. The annular piston 3 includes nose portions 9 associated with the pressure springs 8 and arranged on the piston 3 to embrace projections 19 provided together in the pressure plate 10. In this manner, the annular piston is nonrotatively connected to the outer clutch part 1 so that an undefined rotary movement of the former is avoided.

If, due to slippage of the drive axle, relative movement occurs between the two clutch parts 1, 2, the plates 6 of the viscous control unit are offset relative to each other in a relative rotary movement, with the spacers 7 insuring that the plates 6 are not friction-locked. This insures that the viscous control unit 5 operates as such. The shear forces occurring as a result of the viscous fluid provided in the viscous control unit 5 cause a rise in the temperature of the viscous fluid which, through an increase in volume, affects the pressure acting on the annular piston 3. The annular piston 3, consequently, is pushed toward the friction clutch unit 11 and, in the process, the pressure springs 8 are tensioned. Therefore, by means of the pressure springs 8, excess pressure occurring in the viscous control unit 5 is transmitted directly in the form of a standard force onto the frictional clutch unit 11 which transmits the torque between the two clutch parts.

A stop member 17 insures that, in connection with the pressure springs 8, it is possible to set a maximum standard force for the frictional clutch unit 11 which can be adjusted to existing requirements.

The pressure springs 8 shown in FIG. 1 as helical springs may, of course, be replaced by one or several suitable spring washers. It is possible to use the spring washers in the decreasing spring rate range so that any wear of the frictional plates would lead to an increase in the standard force. Needless to say, it is also possible to select an approximately horizontally extending section of the spring rate which is close to the vertex of the characteristic spring curve in order to maintain a constant spring force in the wear range actually occurring.

The length of the pressure springs 8 is preferably such that no standard force acts on the friction clutch when the control clutch is not under load.

Figure 2:
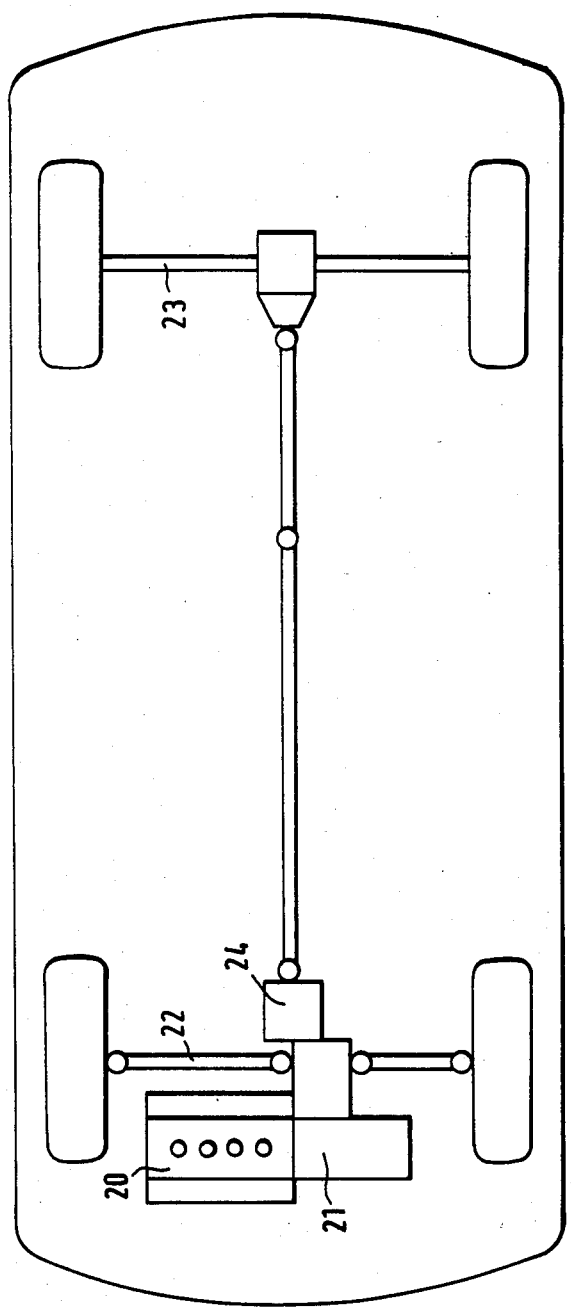
FIG. 2 is a schematic illustration of a control clutch mechanism in accordance with the first aspect of the invention arranged in the longitudinal driveline of a motor vehicle.

FIG. 2 shows the design of a control clutch mechanism used as an additional unit 24 in the longitudinal driveline of a motor vehicle. In FIG. 2, the normal procedure is for the front axle of the motor vehicle to be driven by an engine 20 and a subsequent transmission 21. If the wheels of the front axle 22 are subject to slippage, the control clutch mechanism arranged in the additional unit 24, in view of the above-described effect, begins to pass on a torque to the wheels of the rear axle 23 because, in such a case, due to the slippage, a relative speed occurs between the wheels of the front axle 22 and the wheels of the rear axle 23 which causes the control clutch mechanism to be engaged.

Figure 3:
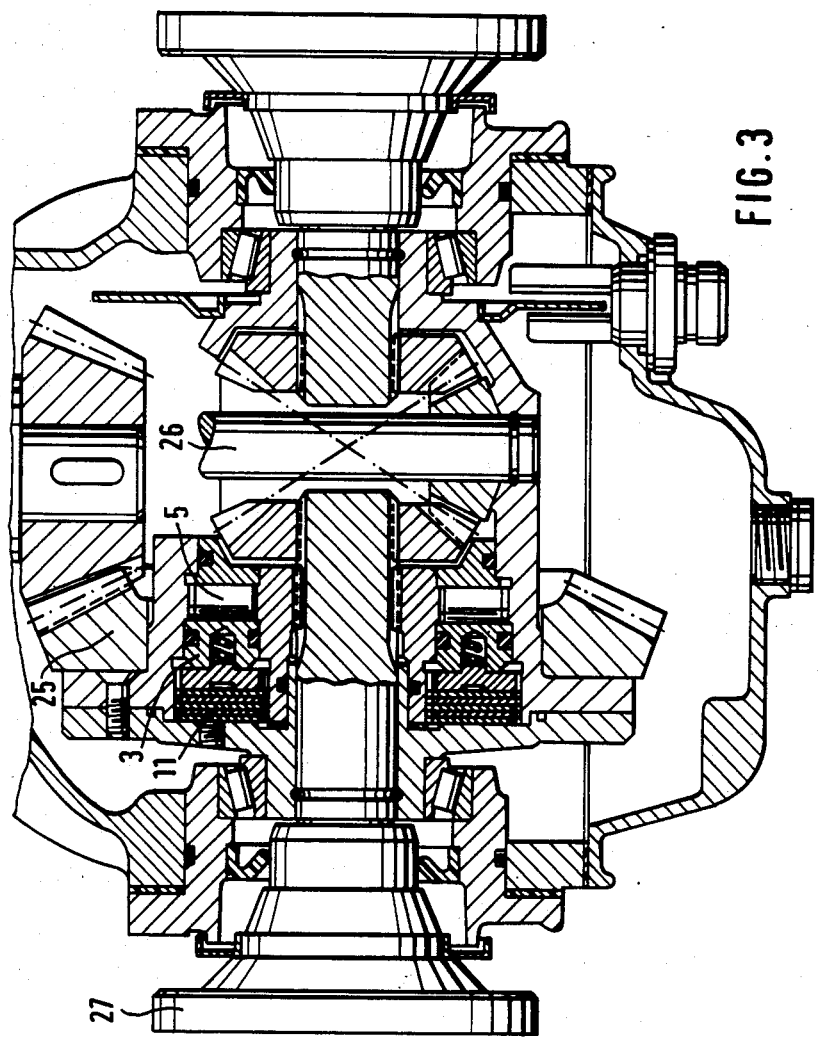
FIG. 3 is a sectional view showing the arrangement of a control clutch mechanism as a differential brake in an axle differential.

FIG. 3 shows a conventional differential gear 26 from which the wheels of an axle are driven by means of stub axles 27 projecting from both ends of the gear. In order to achieve a braking effect for the differential gear 26, if slippage occurs in one of the two driving wheels, a control clutch is arranged between the crown wheel and the right-hand output end which insures that if one wheel slips, its maximum torque is available for the other driven wheel.

In accordance with the foregoing, it will therefore be seen that the first aspect of the present invention is directed toward providing a control clutch mechanism which will transmit a defined maximum nominal torque and which is largely independent of the transmitting behavior of the viscous control unit while, at the same time, making it possible to fill both the viscous control unit and the frictional clutch unit with a fluid which provides optimum conditions for both.

The objectives of the invention are achieved in that the viscous control unit 5 and the frictional clutch unit 11 are separated so as to be leak-proof by an axial movable annular piston 3 with the axial travel of the piston 3 being limited by a stop 17 arranged at the end of the piston facing the frictional clutch unit 11. Between the annular piston 3 and the pressure plate 10 arranged in front of the frictional clutch unit 11 at the annular piston end, provision is made for at least one pressure spring 8 and the viscous control unit 5, as compared with the frictional clutch 11, is structured so as to have a negligibly low transferable nominal torque.

Figure 4:
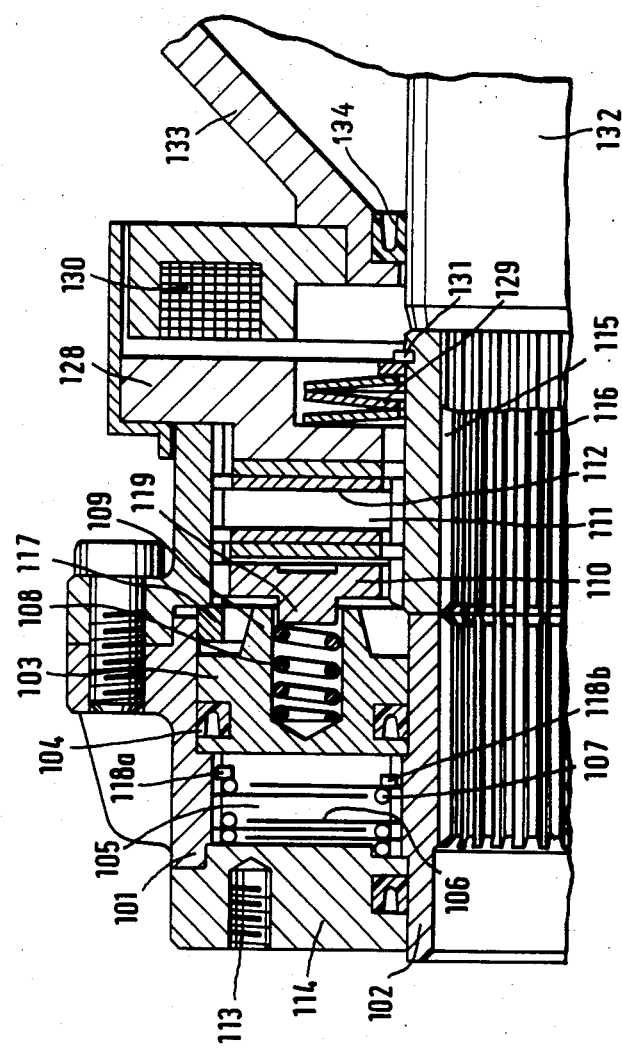
FIG. 4 is a sectional view showing a central clutch mechanism embodying the second aspect of the invention.

The second aspect of the invention is embodied in a control mechanism shown in FIG. 4 which basically comprises a viscous control unit 105 and a frictional clutch unit 111. Furthermore, the control clutch mechanism itself consists essentially of an outer clutch part 101 and a two-part inner clutch part 102 having parts supported against each other. The inner clutch part 102 is provided with a bore 116 containing a multi-wedge profile or splined configuration 115 into which a driving journal 132 engages. The clutch part 102 is axially affixed on the driving journal 132 emerging from a transmission 133. The outer clutch part 101 is provided with a connecting flange 114 which is adapted to be threadedly attached to the drive shaft of a driveline (not shown) by means of fixing bores 113.

The left side of FIG. 4 depicts the viscous control unit 105 as consisting of a plurality of plates 106 which are alternately nonrotatively connected with the outer clutch part 101 and the inner clutch part 102, respectively. Between the plates 106 associated with each of the clutch parts 101, 102, there is provided spacers 107 which may, for example, consist of wire rings.

The plates 106 are limited in their axial movement be inner and outer axial fixing means 118a, 118b.

The right half of FIG. 4 illustrates the frictional clutch unit 111 which again consists of a plurality of plates 112 alternately nonrotatively connected with the outer clutch part 101 and the inner clutch part 102, respectively.

Both the plates of the viscous control unit 105 and of the frictional clutch unit 111 are nonrotatively connected to the clutch parts 101, 102 preferably by means of multi-wedge profiles or splines.

The inside of the friction clutch 111 is provided with a pressure plate 110 which is also nonrotatively attached to the outer clutch part 101. Between the viscous control unit 105 and the frictional clutch unit 111, provision is made for an annular piston 103 which operates to effect a seal which separates the operating chambers of the viscous control unit 105 and of the frictional clutch unit 111. The piston is provided with seals 104 which effect this sealing function while permitting the piston to be slidably movable. The arrangement permits the two operating chambers of the viscous control unit 105 and of the frictional clutch unit 111 to be filled with different fluids and it is also possible for the frictional clutch unit 111 to be a dry clutch.

Between the annular piston 103 and the pressure plate 110, there is a pressure spring 108 arranged in a bore in the annular piston 103. Nose portions 109 associated with the pressure springs 108 and arranged on the annular piston 103 embrace projections 119 provided together with the bores in the pressure plate 110. In this manner, the annular piston 103 is nonrotatively connected with the outer clutch part 101 so that an undefined rotary movement of the former is avoided.

If, as a result of slippage at the drive axle, relative movement occurs between the two clutch parts 101 and 102, the plates 106 of the viscous control unit will be offset relative to each other in a rotary relative direction as a result of relative rotational movement therebetween and the spacers 107 will insure that the plates 106 do not become friction-locked. This insures that the viscous control unit 105 will operate as such. Shear forces occurring as a result of the viscous fluid provided in the viscous control unit 105 cause a rise in the temperature of the viscous fluid which, through increase in volume, will affect the pressure acting upon the annular piston 103.

As a consequence, the piston 103 will be pushed toward the friction clutch 111 and, in the process, the pressure springs 108 will become tensioned. Therefore, by means of the springs 108, excess pressure occurring in the viscous control unit 105 is transmitted directly in the form of a standard force to the frictional clutch unit 111 which transmits the torque between the two clutch parts.

A stop 117 insures that, in connection with the pressure springs 108, it is possible to set a maximum standard force for the frictional clutch unit 111 which can be adjusted to existing requirements.

The springs 108 shown in FIG. 4 are helical springs, but they may, of course, be replaced by one or several suitable spring washers, and it is possible to use spring washers in the decreasing spring rate range so that any wear of the friction plates would lead to an increase in the standard force.

Of course, it will be apparent that it is also possible to select an approximately horizontally extending section of the spring rate which is close to the vertex of the characteristic spring curve in order to maintain a constant spring force in the wear range which actually occurs.

The length of the pressure springs 108 is preferably such that no standard force acts on the friction clutch when the control clutch is not under load.

At the end of the friction clutch unit 111 facing away from the annular piston 103, an annular flange 128 is provided, which, at the end thereof facing away from the frictional clutch unit, is supported against a spring 129. The force of the spring 129 acting on the annular flange 128 is greater than the sum of the spring forces of the springs 108. This means that the annular flange 128 acts for the frictional clutch as a stationary housing limitation.

If necessary, the spring means 129 may be supported against an axial securing ring 131, which, in the embodiment shown, is arranged to operate as a stop, by means of an intermediate plate.

The annular flange 128 is provided with a configuration which is arranged to cooperate with an electromagnet 130 which is also of an annular design. The housing of the electromagnet 130 is firmly connected to a transmission housing 133 by threaded means, for example, with the housing 133 being in sealing engagement with the journal 132 by means of a seal 134.

When the electromagnet 130 is energized by a current source, it will exert a magnetic force on the annular flange 128 and thereby pull it away from the frictional clutch unit 113 against the force of the spring means 129. The spring means may be designed in such a manner that it will operate in the decreasing spring rate range in order to minimize the holding force of the electromagnet 130.

The travel of the annular flange 128 achieved in this manner is of a sufficient length that there is no longer any standard force generated by the springs 108 which will effect the friction clutch unit 111. The clutch, which will now be in the freewheeling state, will no longer transmit force which is especially advantageous or necessary if the control clutch mechanism is used in a vehicle for engaging a further drive axle, if the vehicle has been equipped with an anti-lock system. The electromagnet may easily be energized by means of a brake light switch, for example.

In order to securely avoid any rubbing of the annular flange 128 on the electromagnet 130 when the clutch rotates, the travel of the flange 128 is limited by a stop. This may be achieved by providing the stop 131 if the springs 129 are designed in such a way that they are fully compressed when the magnet 130 is in the operating position.

The control clutch mechanism designed in accordance with the present invention is not limited to the application thereof described herein of engaging a further drive axle, but in the same manner as already mentioned with reference to the first aspect discussed above, it may also be used as a differential lock with the rapid change of the control clutch mechanism into the freewheeling position through the operation of the electromagnet also being obtained in connection with the anti-locking system.

Thus, with reference to the first aspect previously described, it will be seen that the second aspect of the present invention is directed toward a further development and improvement for an automatically engaging control clutch mechanism, wherein an immediate change to the freewheeling position can be achieved.

The objectives of the second aspect of the present invention are achieved in that the friction clutch end facing away from the annular piston is provided with an annular flange, the annular flange being supported against one or several springs exerting a spring force which is greater than the force of the pressure springs associated with the annular piston. As a result of the magnetic field generated by an electromagnet, the annular flange is moved against a stop overcoming the force of the spring at the end facing away from the frictional clutch unit with the travel of the annular flange effected by the force of the magnetic field being such that the load on the springs is completely relieved when the annular piston rests against the stop.

While specific embodiments of the invention have been shown and described in detail to illustrate the application of the inventive principles, it will be understood that the invention may be embodied otherwise without departing from such principles.

What is claimed is:

1. A control clutch mechanism comprising:
  an inner clutch part and an outer clutch part defining an annular space therebetween;
  a viscous control unit and a frictional clutch unit, each consisting of a multi-plate clutch, each of said viscous control unit and said frictional clutch unit consisting of a set of plates arranged in said annular space formed between said clutch parts with each set consisting of plates which are alternately arranged rotatively fixed, respectively, to said inner and outer clutch parts with the plates of said viscous control unit being axially spaced apart a distance which is greater than the thickness of the plates;
  an axially movable annular piston slidingly arranged in fluid-tight engagement between said viscous control unit and said frictional clutch unit;
  a pressure plate located between said annular piston and said frictional clutch unit;
  at least one pressure spring operatively interposed between said annular piston and said pressure plate;
  said viscous control unit being structured to transmit a negligibly low nominal torque as compared with said frictional clutch unit;
  first stop means limiting an axial sliding path of said annular piston;
  an annular flange on said frictional clutch unit at an end thereof facing away from said annular piston;
  second spring means against which said annular flange is supported, said second spring means exerting a force which is greater than a force of said at least one pressure spring;
  second stop means for limiting axial movement of said annular flange; and
  electromagnetic means for generating a magnetic field for moving said annular flange against said second stop means against the force of said second spring means;
  travel of said annular flange effected by said magnetic field being such that loading on said at least one pressure spring is completely relieved when said annular piston rests against said first stop means.

2. A control clutch mechanism according to claim 1, wherein said mechanism is arranged in a driveline connecting two axles with a torque capacity of the control clutch mechanism being slightly higher than a maximum torque introduced by an engine into said driveline.

3. A control clutch mechanism according to claim 1, wherein said control clutch is used as a differential brake.

4. A control clutch mechanism comprising:
  an inner clutch part and an outer clutch part defining an annular space therebetween;
  a viscous control unit and a friction clutch unit each consisting of a multi-plate clutch; each of said viscous control unit and said frictional clutch unit consisting of a set of plates arranged in said annular space formed between said clutch parts, with each set consisting of plates which are alternately arranged rotatively fixed respectively to said inner and outer clutch parts, with the plates of said viscous control unit being held spaced apart an axial distance which is greater than the thickness of the plates;
  an axially movable annular piston slidingly arranged in fluid-tight engagement between said viscous control unit and said frictional clutch unit;
  first stop means limiting an axial sliding path of said annular piston;
  a pressure plate located between said annular piston and said frictional clutch unit;
  first spring means operatively interposed between said annular piston and said pressure plate;
  said viscous control unit being structured to transmit a negligibly low nominal torque as compared with said frictional clutch unit;
  an annular flange on said frictional clutch unit at an end thereof facing away from said annular piston;
  second spring means against which said annular flange is supported, said second spring means exerting a force which is greater than a force of said first spring means;
  second stop means for limiting axial movement of said annular flange; and
  electromagnetic means for generating a magnetic field for moving said annular flange against said second stop means against the force of said second spring means;
  travel of said annular flange effected by said magnetic field being such that loading on said first spring means is completely relieved when said annular piston rests against said first stop means.

5. A control clutch mechanism according to claim 4, wherein said electromagnetic means operates to switch said control clutch mechanism into a freewheeling state.

* * * * *